(12) United States Patent
Kim

(10) Patent No.: US 11,511,141 B2
(45) Date of Patent: Nov. 29, 2022

(54) SHOCK ABSORPTION DEVICE INCLUDING DUAL FALL PREVENTION BAND

(71) Applicant: Korea Top Safety Co., Ltd, Siheung-si (KR)

(72) Inventor: Tae soon Kim, Incheon (KR)

(73) Assignee: KOREA TOP SAFETY CO., LTD, Siheung-si (KR)

(*) Notice: Subject to any disclaimer, the term of this patent is extended or adjusted under 35 U.S.C. 154(b) by 314 days.

(21) Appl. No.: 17/023,603

(22) Filed: Sep. 17, 2020

(65) Prior Publication Data
US 2022/0080234 A1    Mar. 17, 2022

(51) Int. Cl.
*A62B 35/04* (2006.01)
*F16F 7/00* (2006.01)
*A62B 35/00* (2006.01)

(52) U.S. Cl.
CPC .......... *A62B 35/04* (2013.01); *A62B 35/0075* (2013.01); *F16F 7/006* (2013.01)

(58) Field of Classification Search
CPC ....... A62B 35/04; A62B 35/0075; F16F 7/006
See application file for complete search history.

(56) References Cited

U.S. PATENT DOCUMENTS

| | | | | |
|---|---|---|---|---|
| 4,618,026 A * | 10/1986 | Olson | ..................... | A62B 35/04 182/4 |
| 5,487,444 A * | 1/1996 | Dennington | ........... | A62B 35/04 D29/124 |
| 6,851,516 B2 * | 2/2005 | Petzl | ...................... | A62B 35/04 182/3 |
| 7,392,881 B1 * | 7/2008 | Choate | ................... | A62B 35/04 182/4 |
| 8,584,799 B1 * | 11/2013 | Dennington | ........... | A62B 35/04 182/4 |
| 8,701,826 B2 * | 4/2014 | Smith | ..................... | F16F 7/006 182/4 |
| 9,387,350 B2 * | 7/2016 | Gopfert | ............. | A62B 35/0037 |
| 10,702,723 B2 * | 7/2020 | Quigley | ............. | A62B 35/0006 |
| 2006/0207828 A1 * | 9/2006 | D'Acquisto | ........... | A62B 35/04 182/3 |
| 2008/0179136 A1 * | 7/2008 | Griffith | ................. | A62B 35/04 182/5 |
| 2010/0252361 A1 * | 10/2010 | Wood | ................. | A62B 35/0025 182/6 |
| 2012/0067666 A1 | 3/2012 | Smith et al. | | |

* cited by examiner

*Primary Examiner* — Anita M King
(74) *Attorney, Agent, or Firm* — Lex IP Meister, PLLC

(57) ABSTRACT

Disclosed is a shock absorption device including a dual fall prevention band connected to a safety rope connected to a safety harness that a worker wears. The shock absorption device including the dual fall prevention band includes a dual fall prevention band and a shock absorption band. The dual fall prevention band is shaped like a closed loop by coupling opposite ends thereof through a first seam, and the first ring, the second ring, a third ring, and a fourth ring are formed by coupling parts of the dual fall prevention band that face each other at a first position to each other through a second seam, and coupling parts of the dual fall prevention band that face each other at a second position to each other through a third seam.

8 Claims, 4 Drawing Sheets

PRIOR ART

SHOCK ABSORPTION DEVICE INCLUDING DUAL FALL PREVENTION BAND

BACKGROUND OF THE INVENTION

Field of the Invention

The present disclosure relates to a shock absorption device including a dual fall prevention band, and more particularly to a shock absorption device including a dual fall prevention band for preventing a worker from falling even if one seam of the dual fall prevention band becomes unstitched.

Description of the Related Art

In general, various industrial accidents occur at industrial sites, and thereamong, the accident that occurs the most frequently is a fall of a worker, and in order to prevent a work from falling, various safety regulations and safety supplies have been developed and supplied. In particular, in order to be prevented from falling, a worker wears a safety harness including a band, and the safety harness and a safety rope fixed to a fixed support are connected to each other, in which case a shock absorption device for preventing the worker from falling and absorbing a shock applied to the worker when the worker falls is coupled to the safety rope.

The shock absorption device is configured with a dual structure including a shock absorption band for absorbing a shock when a worker falls and a fall prevention band for preventing the worker from falling. The shock absorption band and the fall prevention band are coupled to the shock absorption device through sewing. However, when a seam is of low quality or deteriorates and becomes weak due to long-term use, the seam becomes unstitched, and accordingly, there is a problem in that the worker is not prevented from falling.

FIG. 1 is a diagram showing a conventional shock absorption device 100.

Referring to FIG. 1, the shock absorption device 100 may be separated into a fall prevention band 110 and a fall prevention band 120, opposite ends of the fall prevention band 110 may be folded and fixedly sewn with seams 130 and 140, and the fall prevention band 120 may also be coupled thereto. However, when even one of the seams 130 and 140 has a problem, the seams 130 and 140 may become unstitched while a worker falls, and thus the possibility that the worker falls without being caught may be high. That is, in the structure of the conventional shock absorption device 100, even if even one of the seams 130 and 140 has a problem, there is a problem in that the worker is not prevented from falling.

Various technologies related to a shock absorption device have been developed, such as those disclosed in Korean Patent Publication No. 10-2017-0089358, U.S. Pat. No. 3,444,957, Korean Patent Publication No. 10-2001-0044130, etc. However, all of the shock absorption devices disclosed therein correspond merely to structures for minimizing a shock applied to a worker when the worker falls, and all sewn structures have the same structure as in FIG. 1, and accordingly, when even one seam has a problem, there is a problem in that the worker inevitably falls.

SUMMARY OF THE INVENTION

The present disclosure provides a shock absorption device including a dual fall prevention band for preventing a worker from falling, in the situation, in which a seam forming a ring has a problem and becomes unstitched, by coupling the dual fall prevention band, which forms a closed loop, with a shock absorption band.

According to an aspect of the present disclosure, a shock absorption device including a dual fall prevention band connected to a safety rope connected to a safety harness that a worker wears includes a dual fall prevention band having first and second rings connected to the safety rope and configured to prevent the worker from falling when a fall occurs, and a shock absorption band having a plurality of wing parts fixed to the dual fall prevention band and configured to absorb a shock applied to the worker by gradually unstitching and separating a seam that extends from the wing parts and is sewn when the worker falls, wherein the dual fall prevention band is shaped like a closed loop by coupling opposite ends thereof through a first seam, and the first ring, the second ring, a third ring, and a fourth ring are formed by coupling parts of the dual fall prevention band that face each other at a first position to each other through a second seam, and coupling parts of the dual fall prevention band that face each other at a second position to each other through a third seam.

In the dual fall prevention band, an area of the first seam may be larger than an area of each of the second seam and the third seam.

In the dual fall prevention band, the first ring and the second ring may be formed to face each other, and the third ring and the fourth ring may be formed to face each other.

In the dual fall prevention band, the first seam may be formed on the third ring or the fourth ring.

The first seam may be sewn through contact between an upper surface of one end of the dual fall prevention band and a lower surface of an opposite end of the dual fall prevention band.

In the dual fall prevention band, a length of the third ring and a length of the fourth ring may be the same.

In the dual fall prevention band, the first seam may be formed on the fourth ring, and a length of the fourth ring may be shorter than a length of the third ring.

The shock absorption band may be positioned inside the third ring or the fourth ring.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1:
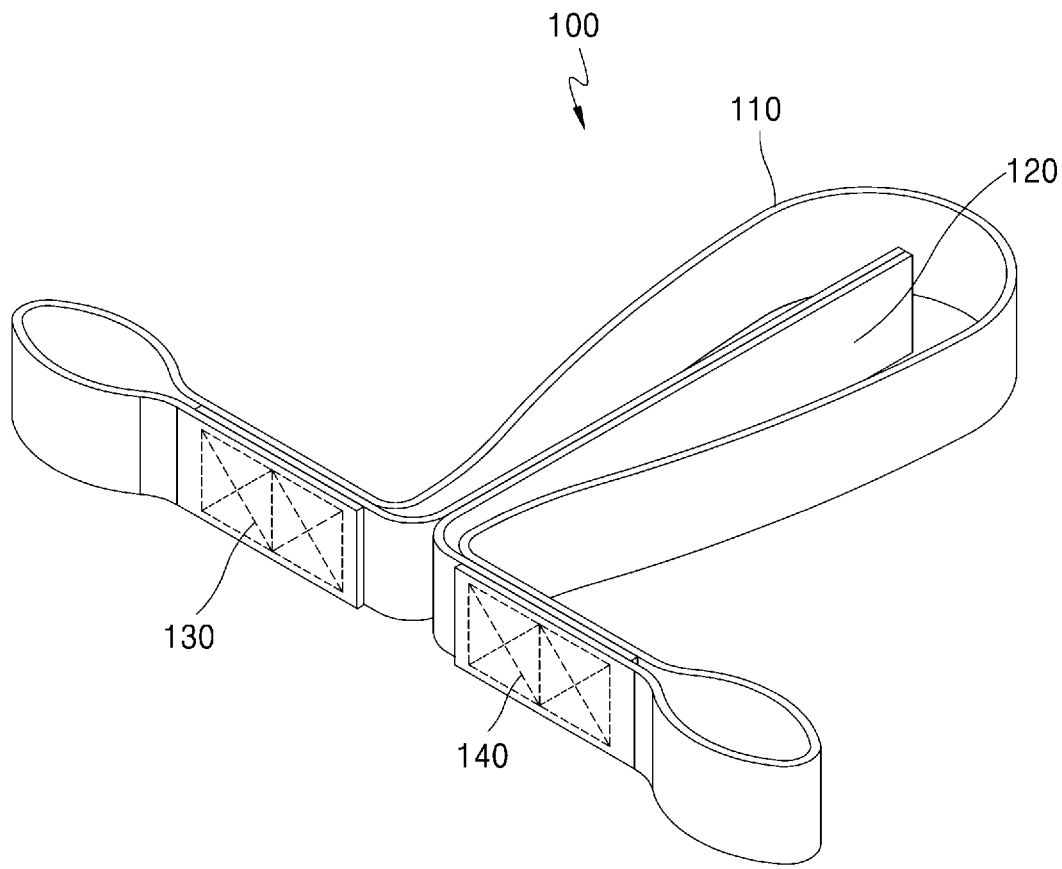
FIG. 1 is a diagram showing a conventional shock absorption device.

The attached drawings for illustrating exemplary embodiments of the present disclosure are to be referred to in order to gain a sufficient understanding of the present disclosure, the merits thereof, and the objectives accomplished through implementation of the present disclosure.

Hereinafter, the present disclosure will be described in detail through explaining exemplary embodiments of the invention with reference to the attached drawings. Like reference numerals in the drawings denote like elements.

Figure 2:
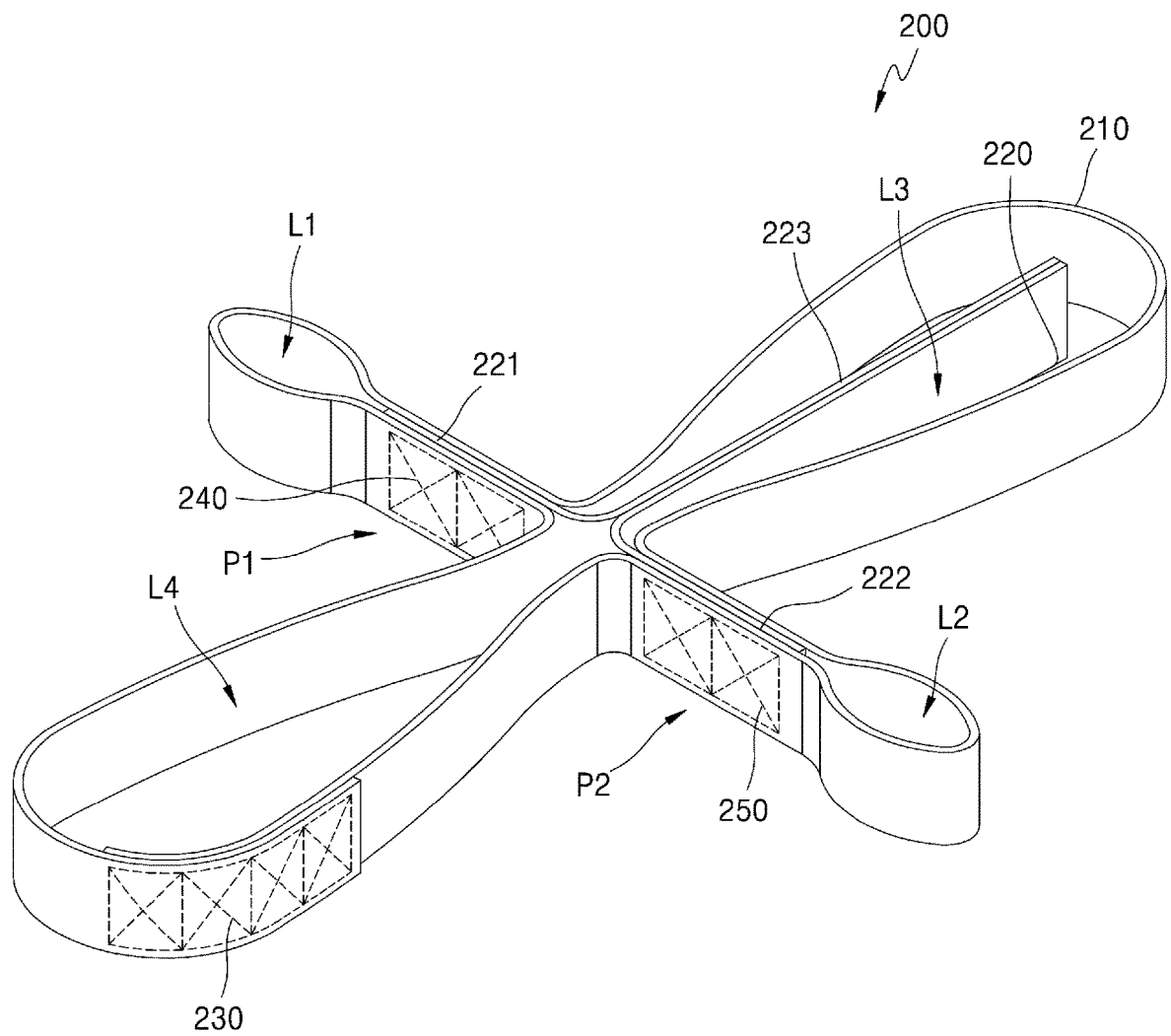
FIG. 2 is a diagram showing a shock absorption device including a dual fall prevention band according to an embodiment of the present disclosure.
Figure 3:
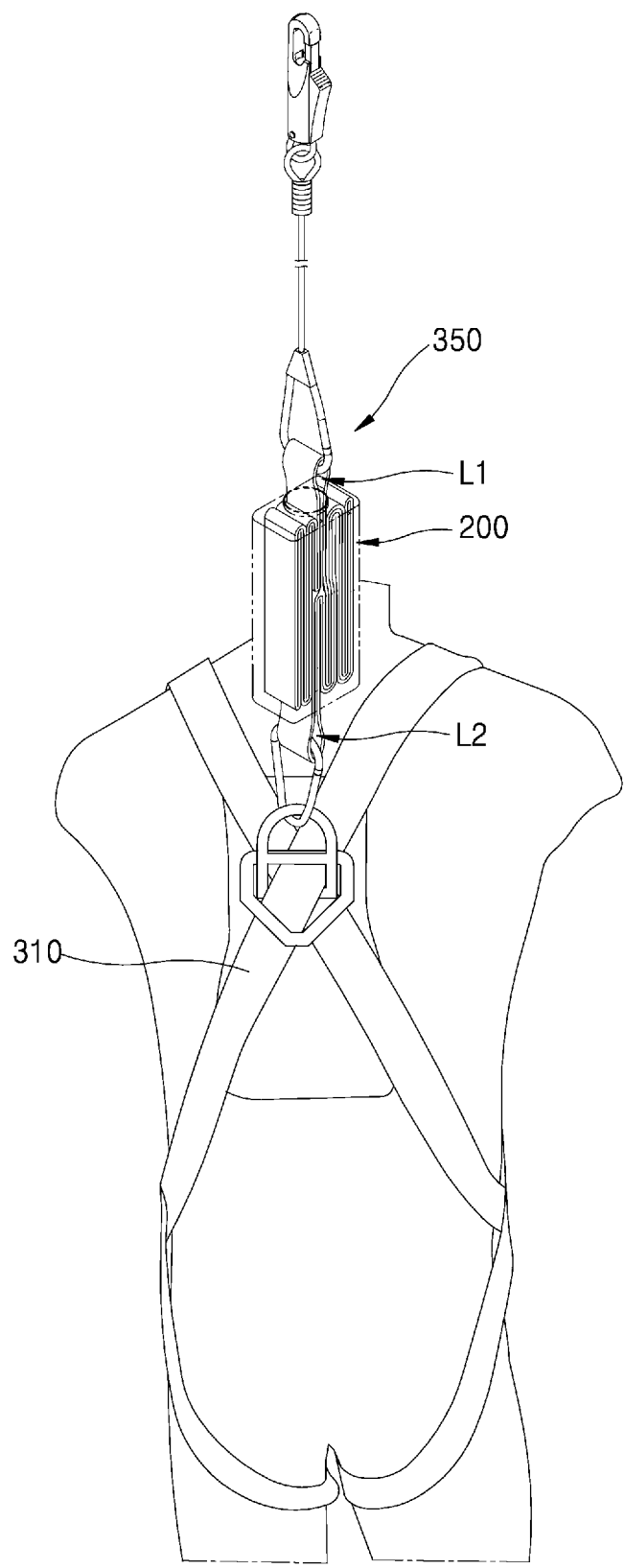
FIG. 3 is a diagram showing an example of the state in which a worker wears the shock absorption device including a dual fall prevention band of FIG. 2.

FIG. 2 is a diagram showing a shock absorption device 200 including a dual fall prevention band according to an embodiment of the present disclosure. FIG. 3 is a diagram showing an example of the state in which a worker wears the shock absorption device 200 including the dual fall prevention band of FIG. 2.

Referring to FIGS. 2 and 3, the shock absorption device 200 including the dual fall prevention band (which is referred to as the "shock absorption device 200") may be connected to a safety rope 350 connected to a safety harness 310 that a worker wears, or an upper part of the safety rope 350 connected between the safety harness 310 and a fixed support (not shown). However, the present disclosure is not limited thereto, and the shock absorption device 200 may also be coupled to various ropes or the like, which are connected in order to prevent the worker from falling.

The shock absorption device 200 may include a dual fall prevention band 210 and a shock absorption band 220. The dual fall prevention band 210 may prevent a worker from falling when a fall occurs by connecting a first ring L1 and a second ring L2 to the safety rope 350.

The dual fall prevention band 210 may be shaped like a closed loop by coupling opposite ends thereof through a first seam 230. That is, the dual fall prevention band 210 may be shaped like a closed loop by sewing opposite ends of a straight-type band using a connecting thread, and hereinafter, the seam that is sewn to make the dual fall prevention band 210 form a closed loop is referred to as the first seam 230. The first seam 230 may be sewn using various methods. For example, the first seam 230 may be sewn through contact between an upper surface of one end of the dual fall prevention band 210 and a lower surface of an opposite end of the dual fall prevention band 210. However, the present disclosure is not limited thereto, and the first seam 230 may be sewn through contact between an upper surface of one end of the dual fall prevention band 210 and an upper surface of an opposite end of the dual fall prevention band 210, or may be sewn through contact between a lower surface of one end of the dual fall prevention band 210 and a lower surface of an opposite end of the dual fall prevention band 210.

Parts of the dual fall prevention band 210 that face each other at a first position P1 may be coupled to each other through a second seam 240, and parts of the dual fall prevention band 210 that face each other at a second position P2 may be coupled to each other through a third seam 250, and accordingly, the first ring L1, the second ring L2, a third ring L3, and a fourth ring L4 may be formed. Similarly to the first seam 230, the second seam 240 and the third seam 250 may also be sewn using a connecting thread and may be sewn using various methods. The first ring L1 and the second ring L2 may be coupled to the safety rope 350 and may be formed at opposite positions. The third ring L3 and the fourth ring L4 may be formed to face each other in a different direction from the direction in which the first ring L1 and the second ring L2 face each other. Although FIG. 2 illustrates the case in which the first seam 230 is formed on the fourth ring L4, the present disclosure is not limited thereto, and the first seam 230 may be formed on one of the first ring L1, the second ring L2, the third ring L3, and the fourth ring L4. The area of the first seam 230 may be larger than the area of each of the second seam 240 and the third seam 250. The length of the third ring L3 may be the same as the length of the fourth ring L4, and the length of the ring on which the first seam 230 is formed, among the third ring L3 and the fourth ring L4, may be shorter than the length of the other ring. As such, according to the present disclosure, various shapes may be used, and accordingly, the possibility that a worker falls without protection when a fall occurs may be remarkably lowered, which will be described in more detail with reference to FIG. 4.

The shock absorption band 220 may be configured in such a way that a plurality of wing parts 221 and 222 is fixed to the dual fall prevention band 210, and accordingly, when a worker falls, the shock absorption band 220 may absorb the shock applied to the worker by gradually unstitching and separating a seam 223 that extends from the wing parts 221 and 222 and is sewn. For example, the shock absorption band 220 may be positioned inside the third ring L3 or the fourth ring L4. The shock absorption band 220 may be a shock absorption band that uses the same method as a method used in the conventional shock absorption device, and the shock absorption band 220 according to the present disclosure may use a conventional shock absorption band using any of various methods, or may use a plurality of shock absorption bands.

The shock absorption device 200 having the above structure may be coupled to the safety rope 350, as shown in FIG. 3, and when the shock absorption device 200 is used onsite, the shock absorption device 200 is coupled to the safety rope 350 in the state in which the volume of the shock absorption device 200 is minimized by folding the third ring L3 and the fourth ring L4 of the dual fall prevention band 210 and the shock absorption band 220, as shown in FIG. 3, and then, when a fall occurs, the worker may be prevented from falling and simultaneously a shock may be absorbed while the dual fall prevention band 210 is unfolded and the seam 223 of the shock absorption band 220 becomes unstitched. Hereinafter, the case in which a fall occurs will be described in more detail with reference to FIG. 4.

Figure 4:
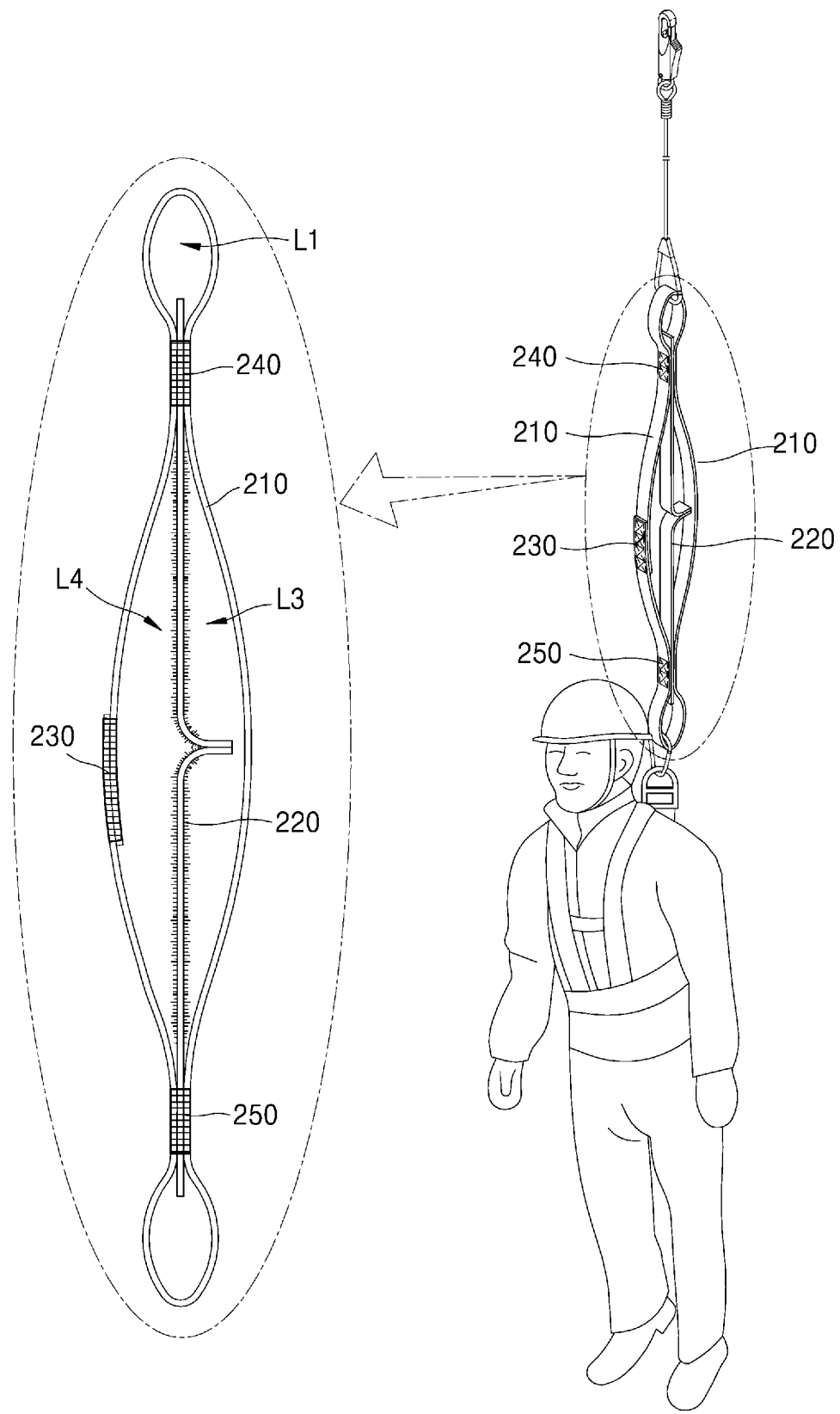
FIG. 4 is a diagram for explaining the case in which the shock absorption device including the dual fall prevention band of FIG. 2 performs a function of preventing a worker from falling.

FIG. 4 is a diagram for explaining the case in which the shock absorption device 200 including the dual fall prevention band of FIG. 2 performs a function of preventing a worker from falling.

Referring to FIGS. 2 to 4, when a fall occurs, the shock absorption device 200 may prevent the worker from falling and may absorb a shock while changing to the state of FIG. 4 from the state of FIG. 3. That is, as described above, when a fall occurs, the shock applied to the worker may be absorbed while the seam 223 of the shock absorption band 220 is gradually unstitched and separated, and simultaneously, the worker may be supported and the worker may be prevented from falling while the third ring L3 and the fourth ring L4 of the dual fall prevention band 210 are unfolded. When the conventional shock absorption device 100 having the shape shown in FIG. 1 is used, when even one of the seams 130 and 140 has a problem and becomes unstitched, the worker inevitably falls. In contrast, according to the present disclosure, even if one of the first seam 230, the second seam 240, and the third seam 250 has a problem and becomes unstitched, the dual fall prevention band 210 may be shaped like a closed loop, and thus the worker may be advantageously prevented from falling.

According to an embodiment of the present disclosure, the first seam 230 may be formed to have a larger area than each of the second seam 240 and the third seam 250, in which case the first seam 230 may more effectively prevent the worker from falling by coupling the dual fall prevention band 210 through stronger force than the second seam 240 and the third seam 250. For example, even if the second seam 240 has a problem and becomes unstitched when a fall occurs, the first seam 230 is sewn in a larger area than the second seam 240, and accordingly, the dual fall prevention band 210 may be prevented from becoming separated using stronger force.

According to another embodiment of the present disclosure, the force applied to the dual fall prevention band 210 may be distributed when a fall occurs by equalizing the length of the third ring L3 and the length of the fourth ring L4, and, when a fall occurs, a higher force may be applied to the first seam 230 than to the second seam 240 and the third seam 250 by shortening the length of the ring on which the first seam 230 is formed, compared with the other ring, among the third ring L3 and the fourth ring L4, thereby preventing the worker from falling. For example, more of the force applied to the dual fall prevention band 210 may be applied to the first seam 230 than to the second seam 240 and the third seam 250 when a fall occurs by forming the first seam 230 on the fourth ring L4 and shortening the length of the fourth ring L4 compared with the length of the third ring L3.

The shock absorption device 200 according to the embodiments of the present disclosure may have a dual structure configured in such a way that the dual fall prevention band 210 is shaped like a closed loop and seams are simultaneously formed at three positions in order to form the first ring L1 to the fourth ring L4, and accordingly, even if any one of the seams becomes unstitched, the worker may be prevented from falling, thereby remarkably lowering the possibility that the worker falls compared with a conventional fall prevention band.

The shock absorption device including the dual fall prevention band according to an embodiment of the present disclosure may be configured in such a way that a dual fall prevention band forming a closed loop and a shock absorption band are coupled to each other, and accordingly, even if a seam forming a ring or a seam forming a closed loop has a problem and becomes unstitched, a worker may be advantageously prevented from falling. For example, the present disclosure may have a dual structure for preventing the worker from falling even if one of a first seam, a second seam, and a third seam becomes unstitched, and accordingly, the possibility that the worker falls due to a problem related to sewing may be advantageously lowered compared with a conventional shock absorption device. In addition, the shock absorption device including the dual fall prevention band according to an embodiment of the present disclosure may be configured in such a way that the first seam for forming a closed loop by the dual fall prevention band is sewn in a larger area than the second or third seam using a connecting thread, and thus, the possibility that the seam becomes unstitched when a worker falls may be remarkably lowered while an increase in the volume of the shock absorption device is minimized, and in addition, the shock absorption device may perform a function of absorbing a shock while a seam gradually becomes unstitched by separately configuring the shock absorption band and the fall prevention band, and may advantageously catch the worker using as strong a force as possible when the worker falls, because the fall prevention band performs only a function of preventing the worker from falling.

As described above, exemplary embodiments have been shown in the specification and the drawings. The terms used herein are selected for the purpose of describing particular embodiments only, and are not intended to be limiting of the invention. Accordingly, it will be understood by those of ordinary skill in the art that various changes and equivalents in form and detail may be made herein without departing from the spirit and scope of the present disclosure as defined by the following claims.

What is claimed is:

1. A shock absorption device comprising a dual fall prevention band connected to a safety rope connected to a safety harness that a worker wears, comprising:
   the dual fall prevention band having first and second rings connected to the safety rope and configured to prevent the worker from falling when a fall occurs; and
   a shock absorption band having a plurality of wing parts fixed to the dual fall prevention band and configured to absorb a shock applied to the worker by gradually unstitching and separating a seam that extends from the wing parts and is sewn when the worker falls,
   wherein the dual fall prevention band is shaped like a closed loop by coupling opposite ends thereof through a first seam, and the first ring, the second ring, a third ring, and a fourth ring are formed by coupling parts of the dual fall prevention band that face each other at a first position to each other through a second seam, and coupling parts of the dual fall prevention band that face each other at a second position to each other through a third seam.

2. The shock absorption device of claim 1, wherein, in the dual fall prevention band, an area of the first seam is larger than an area of each of the second seam and the third seam.

3. The shock absorption device of claim 1, wherein, in the dual fall prevention band, the first ring and the second ring are formed to face each other, and the third ring and the fourth ring are formed to face each other.

4. The shock absorption device of claim 1, wherein, in the dual fall prevention band, the first seam is formed on the third ring or the fourth ring.

5. The shock absorption device of claim 1, wherein the first seam is sewn through contact between an upper surface of one end of the dual fall prevention band and a lower surface of an opposite end of the dual fall prevention band.

6. The shock absorption device of claim 1, wherein, in the dual fall prevention band, a length of the third ring and a length of the fourth ring are the same.

7. The shock absorption device of claim 1, wherein, in the dual fall prevention band, the first seam is formed on the fourth ring, and a length of the fourth ring is shorter than a length of the third ring.

8. The shock absorption device of claim 1, wherein the shock absorption band is positioned inside the third ring or the fourth ring.

* * * * *